Figure 1:
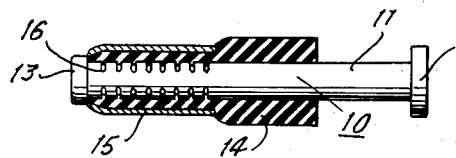

Aug. 31, 1965 W. P. GLANCY 3,203,299
BLIND ANCHORS OR FASTENER MEMBERS
Filed Feb. 5, 1964 2 Sheets-Sheet 1

INVENTOR
Walter P. Glancy

BY Ashley & Ashley
ATTORNEYS

Aug. 31, 1965  W. P. GLANCY  3,203,299
BLIND ANCHORS OR FASTENER MEMBERS
Filed Feb. 5, 1964  2 Sheets-Sheet 2

INVENTOR
Walter P. Glancy

BY *Shley & Shley*

ATTORNEYS

United States Patent Office 3,203,299
Patented Aug. 31, 1965

3,203,299
BLIND ANCHORS OR FASTENER MEMBERS
Walter P. Glancy, 500 NW. 45th St.,
Oklahoma City, Okla.
Filed Feb. 5, 1964, Ser. No. 343,913
2 Claims. (Cl. 85—5)

This application is a continuation-in-part of my copending application, Serial No. 231,058, filed October 12, 1962, and now abandoned, which in turn, is a continuation of my copending application Serial No. 842,300, filed September 25, 1959, also now abandoned, and reference is made thereto.

This invention relates to new and useful improvements in blind anchors or fasterner members.

Specifically, the invention relates to a relatively small plural part stud device adapted to accept a tensile and/or shear load and to be installed in an opening in a supporting medium, the device finding its equivalency in ⅛ to ¼ inch diameter toggle bolts, and similar devices which permit installation from one side of a supporting wall or other panel or support.

A principal object of the invention is to provide an improved blind anchoring device adapted to be positioned in an opening of minimal size, and therefore one that minimally weakens the supporting medium and which assures dependable retention of the object suspended or otherwise held by the anchor device.

An additional object is to provide an improved blind anchoring device which may be securely mounted in various materials of various thicknesses and may be formed with a variety of attaching or supporting elements. Available are embodiments that may be pushed in or hammered in or screwed in, as well as embodiments where the exposed useable section may be unthreaded or may be threaded for coaction with one or two nuts for securely holding the object in question, or with a corresponding thread which has perhaps been formed in the object itself.

Yet another object of the invention is to provide an improved anchoring device fixable in a hard medium for example, one of concrete, tile, brick, glass or metal, but, with particular usefulness in a medium of softer material such as wood, plastic, wallboard or plaster, for the holding of any particular object.

A particular object of the invention is to provide an improved blind anchoring device which may be positioned in a vertical, horizontal, or any other type of surface for securing or supporting an object thereto or therefrom which may be positioned by simple manual insertion of the anchoring device into a previously prepared opening, or which in some forms of the invention may be positioned by tapping or screwing into the opening, and which, in spite of its quite considerable ease of insertion, exhibits great reluctancy toward withdrawal so as to ensure the positive and reliable supporting or securing of a selected object.

An additional object of the invention is to provide an improved blind anchoring device which may be free of projections upon the rearward side of a panel in which it is positioned, which, in some instances may be positioned by lineal insertion into a previously prepared opening, and which under other conditions may undergo moderate rotational movement in the insertion process for more secure anchoring.

Yet a further object of the invention is to provide an improved blind anchoring device employing an elastic, rubber-like sleeve which may be distorted upon insertion into a prepared opening so as to stretch the sleeve and cause it to reduce in diameter whereby the anchoring device may be inserted into the opening, but which, upon removal of the inserting force, retracts and expands toward its normal undistorted position for secure anchoring in the said opening.

A construction designed to carry out the invention will be hereinafter described, together with other features of the invention.

Figure 2:
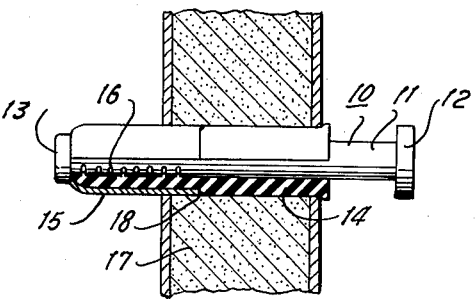
Figure 3:
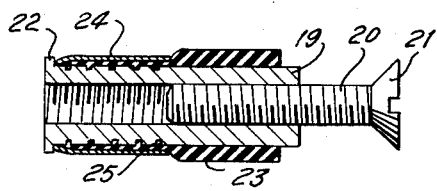
Figure 4:
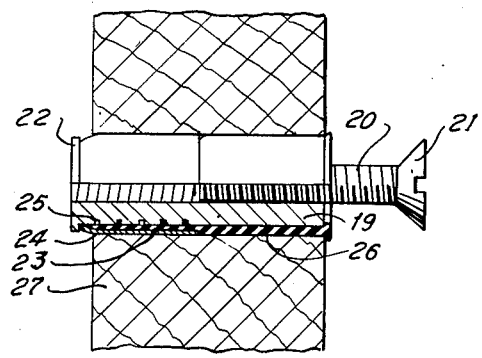
Figure 5:
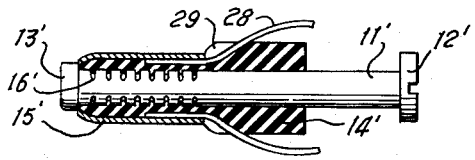
Figure 6:
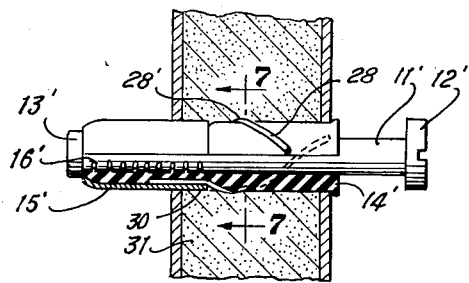
Figure 7:
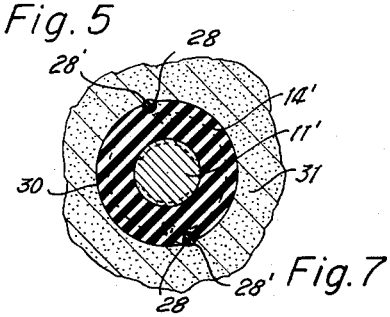
Figure 8:
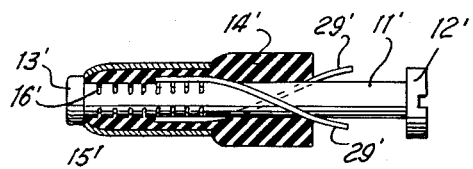
Figure 9:
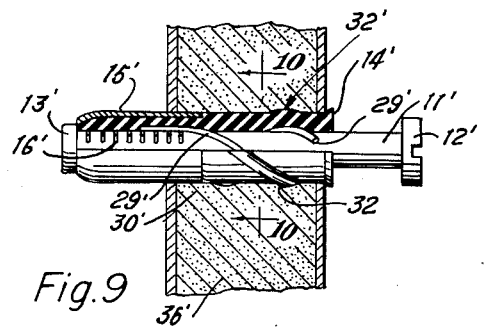
Figure 13:
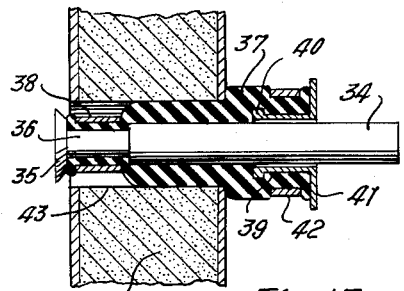
Figure 10:
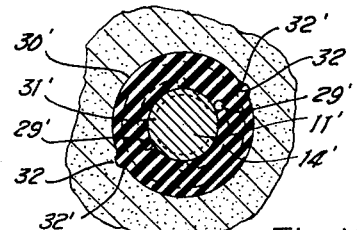
Figure 11:
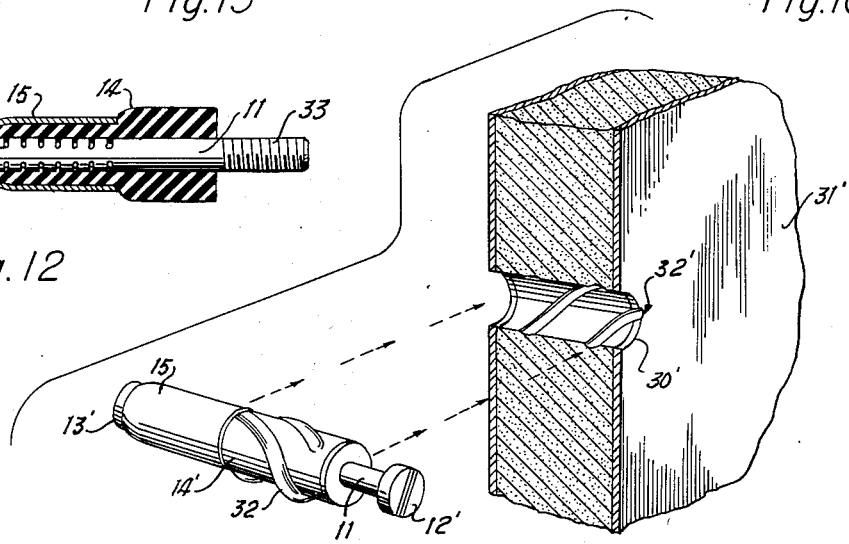
Figure 14:

The invention will be more readily understood from a reading of the following specification and by reference to the accompanying drawings, wherein examples of the invention are shown, and wherein:

FIG. 1 is a longitudinal, sectional view of a blind anchoring device constructed in accordance with this invention and which a simple stud is incorporated, FIG. 2 is a vew partly in elevation and partly in section of the device of FIG. 1 installed in a fragmentarily shown plaster wall or wallboard panel, FIG. 3 is a longitudinal, sectional view of a second embodiment of the invention, FIG. 4 is a view similar to FIG. 2 showing the second form of the invention in mounted position, FIG. 5 is a longitudinal, sectional view of a third embodiment of the invention, FIG. 6 is a view similar to FIG. 2 showing the third form of in the invention in mounted position, FIG. 7 is a cross-sectional view taken on the line 7—7 of FIG. 6, FIG. 8 is a longitudinal, sectional view of a fourth embodiment of the invention, FIG. 9 is a view similar to FIG. 2 showing the fourth form of the invention in mounted position, FIG. 10 is a cross-sectional view taken on the line 10—10 of FIG. 9, FIG. 11 is an exploded view in perspective of the form of the invention shown in FIGS. 8, 9 and 10, FIG. 12 is a longitudinal, sectional view of a fifth embodiment of the invention, FIG. 13 is a longitudinal, sectional view of a still additional embodiment of the invention illustrating a form thereof in which the anchoring device is securely held in position, but may readily be removed when desired, and FIG. 14 is a view similar to FIG. 13 showing the embodiment of FIG. 13 in a stretched position for removal.

In the drawings, the numeral 10 designates a pin or stud having an elongate shank 11 which may be of any suitable or desirable cross-section but which, desirably, for the sake of convenience, is of circular cross-section. The shank is formed with an enlarged head 12 on one end and a somewhat smaller enlarged portion 13 upon its opposite end. A tubular sleeve 14, which may be formed of rubber or some other suitable elastomer, encircles the shank 11 and has one end adjoining the enlarged portion 13. The sleeve 14 may be of any desired length in proportion with the length of the shank 11 but terminates short of the head 12 in order to expose a portion of the shank 11 for supporting or securing purposes. A ferrule 15, desirably formed of metal but which, along with the pin 10, may be formed of synthetic resins or other available materials, encompasses the portion of the sleeve 14 adjacent the enlarged portion 13 and is of such dimensions as to compress the portion of the elastic sleeve 14 to tight and snug engagement with the shank 11. In addition, the portion of the shank underlying the ferrule 15 is formed with notches, grooves, serrations, or other irregularities 16 which function to lock the sleeve 14 to the shank 11 under the influence of the inward pressure supplied by the ferrule 15 and to hold the sleeve 14 against rotation with respect to the shank 11. Obviously, a non-circular cross-section, such as a square cross-section may be employed for this portion of the shank 11, or any other desirable configuration which will, under the application of pressure by the ferrule 15, secure the sleeve 14 to shank 11 in a non-rotatable condition. In addition, the rearward portion of the ferrule 15 adjacent the enlarged portion 13 is distorted or swaged inwardly so as to engage beneath the enlarged portion 13 and thus prevent longitudinal movement of the stud 10 with respect to the ferrule 15 and the elastic sleeve 14.

In use, the fastener or support is positioned in a selected surface or body, such as the wallboard 17 shown in FIG. 2, by drilling therein an opening 18 of sufficient diameter as to receive the ferrule 15 readily, but being somewhat smaller in diameter than the undistorted forward portion of the sleeve 14. The fastening device is then simply pressed into the opening 18, the ferrule 15 passing readily therethrough, and the undistorted forward portion of the sleeve 14 being stretched forwardly toward the head 12 and consequently reduced in diameter as it is pressed into the opening 18. Upon reaching the position shown in FIG. 2, the fastening device is brought to a stop and no further positioning pressure exerted. Under these conditions, the portion of the sleeve 14 not confined beneath the ferrule 15 tends to return to its undistorted position, but is prevented from doing so because of the confining walls of the opening 18. Thus, the forward portion of the elastic sleeve exerts and continues to exert a quite appreciable outward pressure in seeking to contract and return to its normal diameter, and such pressure has been found to provide a quite strong and secure mounting and positioning of the device in such materials as wallboard, laminated panels, sheets of synthetic resin, wood, and the like. The projecting portion of the shank 11 thus may be employed as a support quickly and easily attached to surfaces of somewhat fragile nature, such as wallboard and plaster and in which the mounting of hooks or supports is normally quite difficult. There is no spreading or expanding of the anchoring sleeve 14, but rather, the sleeve is initially distorted during the mounting operation and its continuing tendency to return to an undistorted configuration is relied upon for thorough and secure clamping and supporting of the stud 10 within the opening 18.

A modified form of the invention is shown in FIGS. 3 and 4, this form being adapted specifically to the bolting or clamping of articles to a wall surface, and although the modification of FIGS. 1 and 2 may sometimes be employed for this purpose by continued pressing of the shank 11 inwardly until the head 12 clamps the subject article to the surface of the wallboard 17, a screwthreaded arrangement as shown in FIGS. 3 and 4, is more readily adapted to such purposes. In this second form of the invention, an internally screwthreaded tube 19 forms the core of the fastening device and receives a screw 20 having a slotted head 21. The rearward end of the core 19 if formed with an annular flange 22 functioning in the same manner as the enlarged portion 13 of the shank 11, and a sleeve 23 formed of a suitable elastomer surrounds the core 19. The ferrule 24 clamps the rearward portion of the sleeve 23 upon the rearward portion of the core 19, indentations, grooves, or the like 25 being provided to ensure non-rotatability between the sleeve 23 and the core 19. As shown in FIG. 4, this form of the invention is positioned in substantially the same manner as the first described form, the undistorted portion of the sleeve 23 being forced into the undersized opening 26 of the panel 27 until the front end of the core 19 is substantially flush with the face of the panel 27. The screw 20 may then be positioned as desired within the core 19 and tightened by rotation to clamp or fix a subject article to the surface of the panel 27.

An additional form of the invention is shown in FIGS. 5, 6 and 7 and includes the shank 11' formed with a slotted head 12' and a rearward enlargement 13'. The resilient or elastic sleeve 14' is confined upon the shank by the ferrule 15', the irregularities or serrations 16' also being employed. There are also provided one or more filaments 28 having their rearward ends confined and clamped beneath the ferrule 15' and extending forwardly through shallow grooves 29 extending longitudinally of the unconfined portion of the sleeve 14' to the forward end of the latter sleeve. The grooves 29 may be employed if desired or may be omitted because of the elastic or resilient nature of the sleeve 14', the employment of the grooves being primarily for the purpose of protecting the filaments 28 against the cutting or shearing action of the forward edge of the ferrule 15'.

This modification of the invention is also adapted to be positioned in an undersized opening 30 formed in a panel 31 and is particularly well adapted for use in wallboard, plaster, and other similar soft materials. While the first two forms of the invention may be positioned in the opening either by straight pressing thereinto or by such pressing accompanied by a slight screwing or rotational movement, the last described form of the invention is specifically intended for mounting by pressing into the opening under pressure while rotating the fastener, this desirably being carried out by use of a screw driver engaging the slotted head 12. As the fastener is pressed and rotated into position, the filaments 28 tend to assume a helical configuration, and to function to some degree as screwthreads which cut their own mating threads 28' in the walls of the opening 30 as the fastener is moved into position. Thus, a more secure and positive mounting of the fastener is obtained, the filaments 28 tending to lock the fastener in position and to prevent either its rotation or withdrawal.

The filaments 28 may be of any suitable material, soft metal wire and synthetic resin filaments having been found suitable. The filaments may be made up of a number of fine or small wires or fiber-like elements, or may comprise a single, homogeneous filament formed entirely of metal, plastic, or other suitable material. Certain vegetable fibers could be employed, such as cotton, sisal, and the like, but again, synthetic resin filaments have been found most suitable.

An alternate arrangement of the filaments is shown in FIGS. 8 and 9 in which the filaments 29' are confined between the shank 11' and the sleeve 14', and preferably arranged in a helical configuration. As shown in FIG. 9, in which this modification is positioned in the opening 30' of the panel 31', as the fastener is forced into the opening 30', the presence of the filaments 28' beneath the unclamped portion of the sleeve 14' causes bulges 32, of a helical shape, to occur upon the outer surface of the sleeve 14, these bulges also functioning in the manner of the filaments 28 in that they constitute approximations of screwthreads which, as illustrated in FIG. 11, crush or cut mating screwthreads 32' in the panel 31' for more secure and positive mounting of the fastener in the wall panel.

Figure 12:
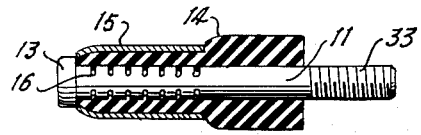

As a further modification of the form of fastener shown in FIG. 1, the head 12 may be omitted and the outer portion of the shank screwthreaded as shown at 33 in FIG. 12, the fastener of this further modification otherwise being the same as that of FIG. 1.

A readily removable form of the invention is shown in FIGS. 13 and 14 and includes a shank 34 which may have any suitable or desirable type of securing means on its exposed end such as the head 12 of FIG. 1, the internal screwthreads of the core 19 of FIG. 3, the slotted head 12' of FIG. 5, the external screwthreads 33 of FIG. 12 or any other desirable arrangement. The shank 34 has its rearward end terminating in a bevelled head 35 adjoined by a reduced diameter portion 36 which receives the rearward end of the elastomer sleeve 37, the sleeve 37 being clamped thereto by the surrounding ferrule 38. In the forward end of the sleeve 37, there is provided a short sleeve 39 having a sliding fit on the shank 34 and provided at its rearward end with an annular, outwardly-projecting flange 40. A flange 41 of somewhat greater diameter is provided at the forward end of the sleeve 39, and the forward portion of the sleeve 37 is clamped to the sleeve 39 by a surrounding band or ferrule 42. Desirably, the flange 41 is of as great or slightly greater diameter than the forward portion of the sleeve 37 so that the flange may be grasped by the fingers, or desirably between the first and second fingers while pressure is applied to the shank 34 in the opposite direction with a person's thumb. Since the sleeve 39 is anchored securely in the forward portion of the sleeve 37 by means of the flange 40 and ferrule 42, such action stretches the sleeve 37 forwardly over the shank 34 causing it to undergo a reduction in diameter. In this manner, as illustrated in FIG. 14, an undersized opening 43 may be cut in a panel 44, and the resilient sleeve 37 stretched forwardly as shown and described so as to cause the resilient sleeve to undergo a reduction in diameter permitting its ready insertion into the opening 43. The forward pressure on the flange 41, in opposition to the rearward pressure on the shank 34, is then removed allowing the resilient sleeve 37 to seek to expand to its normal diameter whereby the fastening member is securely positioned and mounted in the panel 44, as shown in FIG. 13. At any time it becomes desirable to remove the fastening member from the panel 44, the operation may simply be repeated the sleeve 37 being grasped between one's first and second fingers immediately rearwardly of the flange 41 and rearward or inward pressure applied to the shank 34 by a person's thumb in order to stretch the sleeve 37 forwardly, causing it to undergo a reduction in diameter and permitting the fastening unit to be readily withdrawn from the opening 43. In this manner, the fastening member may be repeatedly positioned in and removed from the opening 43 and yet retain its property of providing a very secure mounting in a panel or support formed of any material.

It will be seen that each modification of the invention includes a central shank or core member having some type of fastening means projecting from the forward end thereof and having a rearward portion enclosed in an elastomer sleeve, a part of which is clamped securely to the rearward end of the shank or core member. Also, in each form of the invention the shank or core member is held against rotation with respect to the elastomer sleeeve and, as an adjunct, held against forward movement through the sleeve in order to prevent dislodgment and forward movement of the core member or shank after the sleeve is anchored in position in the panel or other structure receiving the fastening member. In some forms of the invention, this prevention of forward movement is also of value in removing the fastening member from the panel or other structure. In each form of the invention, the elastomer sleeve is forced into an undersized opening and caused to undergo longitudinal distortion and forward sliding over the shank resulting in contraction or diminution of the outside diameter of the sleeve. After removal of the positioning force, the sleeve tends to return to its undistorted configuration whereby the sleeve and the fastening member are securely anchored in position.

It will be obvious that although the invention has been described in comparatively general terms, it is essentially and primarily limited to fasteners of relatively small diameter and essentially to fasteners having an effective diameter of the magnitude of a fraction of an inch, principally in the area of ¼ to ½ or ¾ inch. The main field of use would be in the area of ¼ inch diameter, give or take a few ¹⁄₁₆ of an inch or so, and it is in these confines that the invention displays its true novelty. Its ease of use and installation its most unobvious firmness of installation and surprising security of mounting and fastening become readily apparent in this relatively restricted field. Accordingly, as utilized herein and in the claims appended hereto, the phrase "of a diameter of the order of magnitude of a fraction of an inch" is intended and does mean a fastener having a diameter of and requiring an installation opening of from that smallest diameter useable by human, manual and tactile performance up to and including ¼ to ¾ inch diameters. The invention is therefore limited and proscribed as useful only within the confines of fasteners having a maximum diameter of one inch or less. Above a diameter of one inch, the fastener loses its unique and unobvious securing characteristics.

Although only anchors or fastening members of circular cross-section are illustrated in the drawings, it is manifest that various cross-sectional shapes may be employed such as square, elliptical, rectangular, and the like, to fit in openings of corresponding shapes.

It should be noted that although the drawings purport to show the various blind anchors as being disposed not entirely within their respective receptional openings, they may be positioned entirely within, or 25%, 50% or even 75% or more within such openings, so long as an effective wall gripping area for the gripping portions of the anchors or fasteners remains available for engagement with the engageable surface of the openings.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A blind anchor of a diameter of the order of magnitude of a fraction of an inch including, a central core member having means on its forward end for engaging an article to be held to a surface, an elastomer sleeve initially having a substantially uniform outer diameter throughout the major portion of its length enclosing and engaging throughout its length at least the rearward portion of the core member, means encompassing the rearward end of the member and contracting the entire rearward end of the sleeve to an outside diameter less than the outside diameter of the forward portion of the sleeve whereby when the blind anchor is forced into an opening large enough to receive the rearward end of the sleeve but too small to receive the forward end of the sleeve the forward portion of the sleeve is distorted longitudinally to compress and elongate and reduce the diameter of the forward portion of the sleeve to substantially the diameter of the opening and permit it to enter the opening and frictionally engage the same, the forward portion of the sleeve in the undistorted condition having a cross sectional area greater than the cross sectional area of said contracted end and the opening and slideably engaging the core member so that when the forward portion of the sleeve is forced into the opening the forward portion elongates and contracts to permit the unrestricted entry of said forward portion into the opening, and filaments secured to the rearward portion of the sleeve and having free forward ends extending externally of the forward portion of the sleeve.

2. A blind anchor of a diameter of the order of magnitude of a fraction of an inch including, a central core member having means on its forward end for engaging an article to be held to a surface, an elastomer sleeve initially having a substantially uniform outer diameter throughout the major portion of its length enclosing and engaging throughout its length at least the rearward portion of the core member, means encompassing the rearward end of the member and contracting the entire rearward end of the sleeve to an outside diameter less than the outside diameter of the forward portion of the sleeve whereby when the blind anchor is forced into an opening large enough to receive the rearward end of the sleeve but too small to receive the forward end of the sleeve the forward portion of the sleeve is distorted longitudinally to compress and elongate and reduce the diameter of the forward portion of the sleeve to substantially the diameter of the opening and permit it to enter the opening and frictionally engage the same, the forward portion of the sleeve in the undistorted condition having a cross sectional area greater than the cross sectional area of said contracted end and the opening and slideably engaging the core member so that when the forward portion of the sleeve is forced into the opening the forward portion elongates and contracts to permit the unrestricted entry of said forward portion into the opening, and filaments secured to the rearward portion of the sleeve and having free forward ends extending between the core member and forward portion of the sleeve.

References Cited by the Examiner

UNITED STATES PATENTS

| | | | |
|---|---|---|---|
| 2,314,386 | 3/43 | Brend | 285—347 |
| 2,882,780 | 4/59 | Edwards | 85—5 |

FOREIGN PATENTS 700,379   12/53   Great Britain.

EDWARD C. ALLEN, *Primary Examiner.*